(12) United States Patent
Zhao et al.

(10) Patent No.: US 12,346,205 B2
(45) Date of Patent: Jul. 1, 2025

(54) METHOD, DEVICE AND COMPUTER READABLE MEDIUM FOR GARBAGE COLLECTION

(71) Applicant: EMC IP Holding Company LLC, Hopkinton, MA (US)

(72) Inventors: Jingrong Zhao, Chengdu (CN); Qingxiao Zheng, Chengdu (CN); Yi Wang, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 114 days.

(21) Appl. No.: 16/792,773

(22) Filed: Feb. 17, 2020

(65) Prior Publication Data
US 2021/0117275 A1    Apr. 22, 2021

(30) Foreign Application Priority Data
Oct. 17, 2019   (CN) .......................... 201910989992.8

(51) Int. Cl.
*G06F 11/14*    (2006.01)
(52) U.S. Cl.
CPC ...... *G06F 11/1448* (2013.01); *G06F 2201/80* (2013.01)
(58) Field of Classification Search
CPC .................. G06F 11/1448; G06F 2201/80
See application file for complete search history.

(56) References Cited

U.S. PATENT DOCUMENTS

| | | | |
|---|---|---|---|
| 7,451,168 B1 | 11/2008 | Patterson | |
| 8,224,935 B1* | 7/2012 | Bandopadhyay | G06F 9/5072 709/248 |
| 10,019,323 B1* | 7/2018 | Bai | G06F 16/184 |
| 10,409,692 B1 | 9/2019 | Brenner et al. | |
| 11,169,889 B1* | 11/2021 | Warfield | G06F 3/0653 |
| 2007/0130185 A1* | 6/2007 | Miller, III | G06F 16/9027 |
| 2011/0131185 A1* | 6/2011 | Kirshenbaum | G06F 11/1448 707/654 |
| 2013/0013874 A1* | 1/2013 | Graefe | G06F 11/1469 711/E12.103 |
| 2014/0281307 A1* | 9/2014 | Peterson | G06F 11/1402 711/162 |
| 2015/0244795 A1* | 8/2015 | Cantwell | G06F 16/27 709/202 |
| 2016/0283372 A1* | 9/2016 | Davis | G06F 3/0616 |
| 2017/0371889 A1 | 12/2017 | Golander et al. | |

(Continued)

FOREIGN PATENT DOCUMENTS

CN        102024018 A    4/2011
CN        109614051 A    4/2019

*Primary Examiner* — Tony Wu
(74) *Attorney, Agent, or Firm* — WOMBLE BOND DICKINSON (US) LLP

(57) ABSTRACT

Embodiments of the present disclosure relate to a method, device and computer readable storage medium for data collection. The method includes: determining, based on a flag associated with at least some nodes in a tree representation in the backup system, whether a node in the tree representation is associated with a valid backup or an invalid backup; in response to determining that the node is associated with a valid backup, keeping the node and nodes referred to by the node; and in response to determining that the node is associated with an invalid backup, deleting the node.

10 Claims, 7 Drawing Sheets

(56) References Cited

U.S. PATENT DOCUMENTS

2018/0089033 A1    3/2018  Tamura et al.
2019/0129893 A1*  5/2019  Baird, III ............ G06F 16/2474
2020/0342117 A1*  10/2020  Richards ............... G06F 21/602

* cited by examiner

METHOD, DEVICE AND COMPUTER READABLE MEDIUM FOR GARBAGE COLLECTION

CROSS-REFERENCE TO RELATED APPLICATION

This patent application claims priority, under 35 U.S.C. § 119, of Chinese Patent Application No. 201910989992.8, filed Oct. 17, 2019, which is incorporated by reference herein in its entirety.

FIELD

Embodiments of the present disclosure generally relate to a storage system, and more specifically, to a method, device and computer readable storage medium for garbage collection in a backup system.

BACKGROUND

In the current garbage collection solution, a reference number array is created for a data chunk to represent how many backups refer to the data chunk. At least 8 bits are typically used to record the real reference number. For a large-scale backup system, this occupies a lot of memory space of the system, impacts badly the system performance and thus limits the maximum support capacity size.

During garbage collection, the current garbage collection solution needs to traverse all backups no matter whether the backup is valid or whether it is a target of the garbage collection. Therefore, the garbage collection solution is relatively complicated. Once initialization of the reference number array is completed, it is required to periodically check each of the data in the array, remove zero-referred data chunks and update others' values if needed. The time complexity is $O(n'')$.

SUMMARY

The embodiments of the present disclosure provide a method, device, computer-readable storage medium and computer program product for managing a storage system.

In a first aspect, there is provided a method for garbage collection in a backup system. The method comprises determining, based on a flag associated with at least a part of nodes in a tree representation of the backup system, whether a node in the tree representation is associated with a valid backup or an invalid backup; in response to determining that the node is associated with a valid backup, keeping the node and one or more nodes that the node references; and in response to determining that the node is associated with an invalid backup, deleting the node.

In a second aspect, there is provided a method for garbage collection in a backup system. The method comprises: determining, based on metadata of the backup system, whether a first hash in a hash tree of the backup system is associated with a valid backup or an invalid backup; in response to determining that the first hash is associated with a valid backup, keeping the first hash and one or more hashes that the first hash references; in response to that the first hash is associated with an invalid backup, determining whether the first hash references one or more second hashes; in response to determining that the first hash references the one or more second hashes, traversing the one or more second hashes and then deleting the first hash; and in response to determining that the first hash does not reference any second hash, deleting the first hash.

In a third aspect, there is provided a device for managing a storage system. The device comprises: a processing unit; and a memory coupled to the processing unit and having instructions stored thereon, the instructions when executed by the processing unit causing the device to execute acts comprising determining, based on a flag associated with at least a part of nodes in a tree representation of the backup system, whether a node in the tree representation is associated with a valid backup or an invalid backup; in response to determining that the node is associated with a valid backup, keeping the node and one or more nodes that the node references; and in response to determining that the node is associated with an invalid backup, deleting the node.

In a fourth aspect, there is provided a device for managing a storage system. The device comprises: a processing unit; and a memory coupled to the processing unit and having instructions stored thereon, the instructions when executed by the processing unit causing the device to execute acts comprising determining, based on metadata of the backup system, whether a first hash in a hash tree of the backup system is associated with a valid backup or an invalid backup; in response to determining that the first hash is associated with a valid backup, keeping the first hash and one or more hashes that the first hash references; in response to that the first hash is associated with an invalid backup, determining whether the first hash references one or more second hashes; in response to determining that the first hash references the one or more second hashes, traversing the one or more second hashes and then deleting the first hash; and in response to determining that the first hash does not reference any second hash, deleting the first hash.

In a fifth aspect, there is provided a computer-readable storage medium having machine-executable instructions stored thereon, which cause, when executed by at least one processor, the at least one processor to implement the method according to the first aspect.

In a sixth aspect, there is provided a computer-readable storage medium having machine-executable instructions stored thereon, which cause, when executed by at least one processor, the at least one processor to implement the method according to the second aspect.

In a seventh aspect, there is provided a computer program product stored on a computer-readable medium and including machine-executable instructions which cause, when executed by a machine, to execute the method according to the first aspect.

In an eighth aspect, there is provided a computer program product stored on a computer-readable medium and including machine-executable instructions which cause, when executed by a machine, to execute the method according to the second aspect.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description on the example embodiments of the present disclosure with reference to the accompanying drawings, the above and other objectives, features and advantages of the present disclosure will become more apparent, in which the same reference symbols refer to the same components.

DETAILED DESCRIPTION OF EMBODIMENTS

The preferred embodiments disclosed herein will be described in detail below with reference to the accompanying drawings. Although the drawings illustrate the preferred embodiments of the present disclosure, it would be appreciated that the present disclosure can be implemented in various forms but cannot be limited by the embodiments described herein. Rather, those embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an embodiment" are to be read as "at least one example embodiment." The term "another embodiment" is to be read as "at least one other embodiment." The terms "first," "second," and the like may refer to different or same objects. Other definitions, explicit and implicit, may be included below.

In a backup system that supports deduplication, a data chunk is only stored once but can be referred to multiple times. As such, the storage space of the system can be saved. For example, the backup data may be divided into a plurality of data chunks, and then the hash algorithm may be performed on each data chunk to acquire the unique hash. With those data chunks along with their hashes, a hash tree or Merkle tree can be used to represent a backup.

Figure 1:
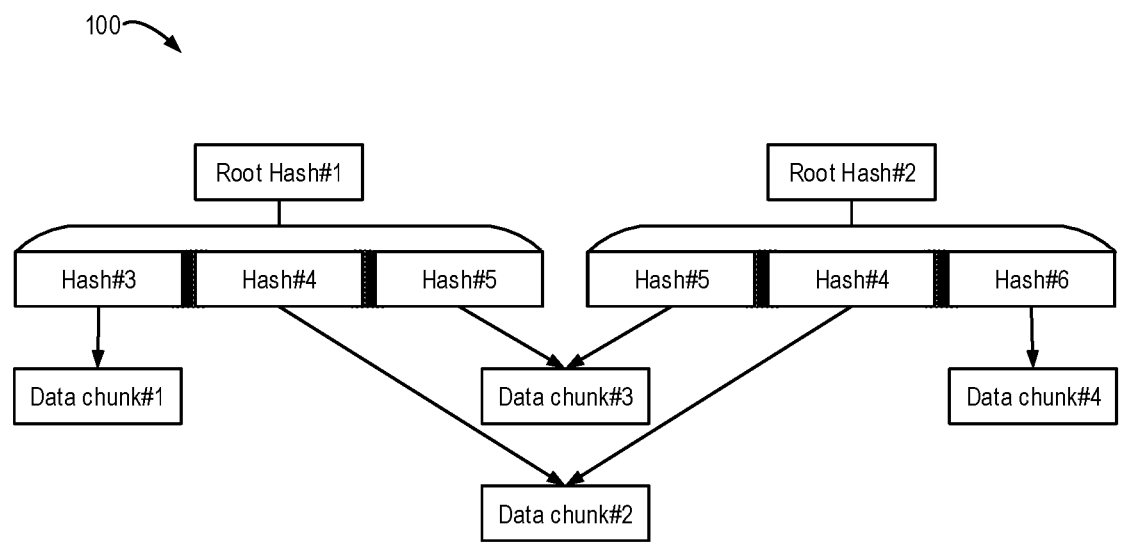
FIG. 1 illustrates a schematic diagram of a backup system according to some embodiments of the present disclosure.

FIG. 1 illustrates a schematic diagram of a backup system 100 according to some embodiments of the present disclosure. The backup system 110 provides backups in the form of a hash tree and supports deduplication in an indexing manner. As shown in FIG. 1, the backup system 100 includes two backups which are represented by a root hash #1 and a root hash #2, respectively. It would be appreciated that the backup system is provided merely as an example, in which the number of backups may be much greater than 2, and the structure of the hash tree may be more complicated.

As shown in FIG. 1, the root hash #1 refers to the hash #3, the hash #4 and the hash #5, where the hash #3 refers to a data chunk #1, the hash #4 refers to a data chunk #2, and the hash #5 refers to a data chunk #3. The root hash #2 refers to the hash #5, the hash #4 and the hash #6, where the hash #5 refers to the data chunk #3, the hash #4 refers to the data block #2, and the hash #6 refers to the data chunk #4. For example, the hash #3 may be a hash of the data chunk #1 or a part thereof, and the root hash #1 is a hash of a data chunk connecting the hash #3 to the hash #5 in series. Other hashes are created likewise.

In the existing garbage collection solution, when garbage collection is started, an array may be generated in the memory, for recording a reference number of each node. Then, the reference number of each node is determined by traversing all backups, and values in the respective reference array are updated. For example, the reference number is typically represented in a number having more than 8 bits, to satisfy the needs of the backup system.

For example, for the backup system as shown in FIG. 1, an original reference number value in an index file or array may be as follows:
reference count array[hash #1]=1;
reference count array[hash #2]=1;
reference count array[hash #3]=1;
reference count array[hash #4]=2;
reference count array[hash #5]=2;
reference count array[hash #6]=1.

Supposing that the backup #1 is expired, the reference array will be changed to:
reference count array[hash #1]=0;
reference count array[hash #2]=1;
reference count array[hash #3]=1;
reference count array[hash #4]=2;
reference count array[hash #5]=2;
reference count array[hash #6]=1.

In the first round of garbage collection, since the reference number of the root hash #1 is zero, the data chunk represented by the root hash #1 will be deleted. The hash #3, hash #4 and hash #5 are referred to by the root hash #1. Therefore, after deleting the data chunk represented by the root hash #1, the respective reference numbers of the hash #3, hash #4 and hash #5 are decreased by 1. As a result, the reference number array is updated as below:
reference count array[hash #2]=1;
reference count array[hash #3]=0;
reference count array[hash #4]=1;
reference count array[hash #5]=1;
reference count array[hash #6]=1.

In the second round of garbage collection, the data chunk #3 represented by the hash #3 is deleted because the reference number of the hash #3 is zero. Subsequently, the garbage collection is stopped for there is no data chunk with the reference number being zero.

The final reference number array is as follows:
reference count array[hash #2]=1;
reference count array[hash #4]=1;
reference count array[hash #5]=1;
reference count array[hash #6]=1.

In a real backup system, the data amount is huge. The reference number array occupies a lot of memory space, which is created using massive system resources no matter whether valid data or invalid data are referred to. Since the array is used to record the reference number, there are lots of no-in-use slots reserved therein. In addition, the array is visited recurrently to remove the zero-referred data chunks and update the reference numbers of other related data chunks. The time complexity of the existing garbage collection solution is $O(n^n)$. As a result, it will badly impact the system performance.

For example, if the reference number has an 8-bit length, the entire storage space of the system is 16 TB, and each data block has an average size of 24 KB, there are about 1 billion hashes. In the case, the storage space required by the valid records in the reference number array is at least 1 GB. With the increase of data, the garbage collection solution turns out to be the bottle neck of the system. Since the resources consumed in the garbage consumption may cause the entire system hung, it needs to limit the maximum capacity that the system can support.

Figure 2:
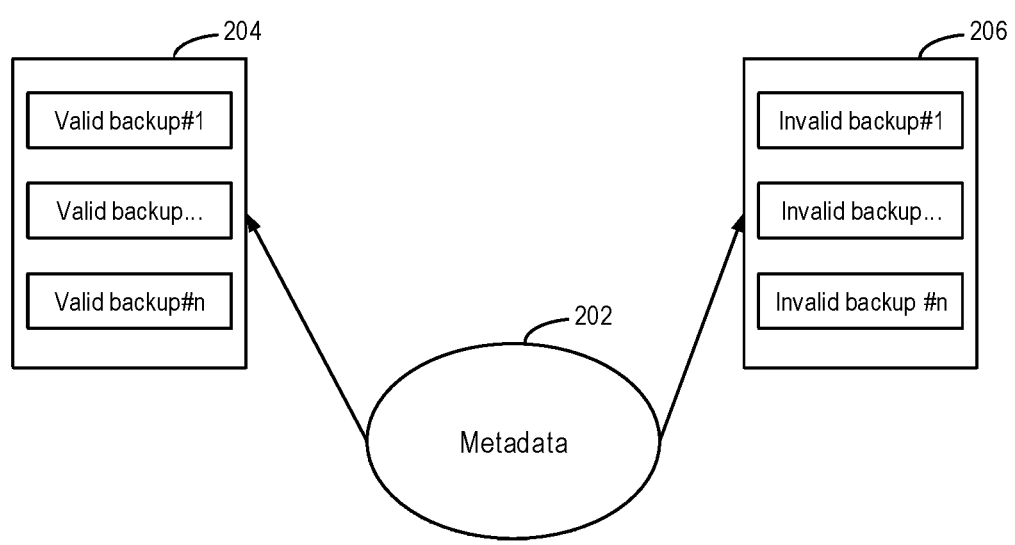
FIG. 2 illustrates a schematic diagram of metadata of a backup system according to some embodiments of the present disclosure.

To this end, the embodiments of the present disclosure provide an improved garbage collection solution. Hereinafter, reference will be made to FIGS. 2-4 to introduce a garbage collection solution according to some embodiments of the present disclosure. FIG. 2 illustrates a schematic diagram of metadata 202 of a backup system according to some embodiments of the present disclosure. As shown in FIG. 2, a database of the metadata 202 may be traversed to divide the metadata 202 into a set 204 and a set 206, where the set 204 includes all valid backups, and the set 260 covers all invalid backups.

Figure 3:
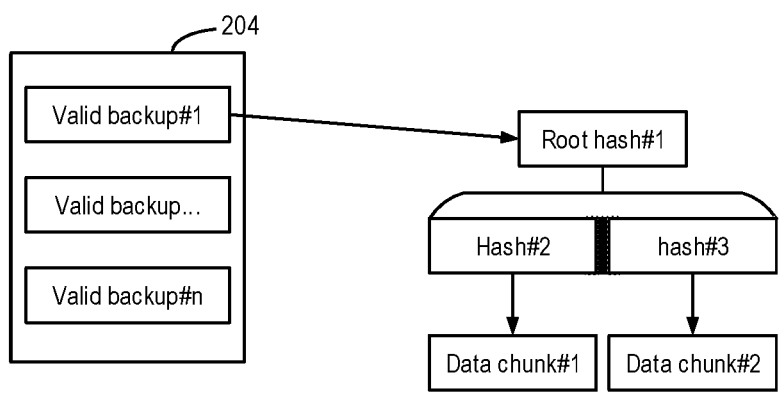
FIG. 3 illustrates a schematic diagram of valid backups of a backup system according to some embodiments of the present disclosure.

FIG. 3 illustrates a schematic diagram of valid backups of a backup system according to some embodiments of the present disclosure. As shown in FIG. 3, flag generation, reference mapping or recording is performed only for data blocks referred to by valid backups in the set 204. For example, a single-bit flag may be used to indicate that a respective data chunk is referred to. For example, for each backup in the set 204, each node in the hash tree of the backup may be traversed, and the hash, as an index, assigns the flag of the node a value of 1. Since the hash is complicated, the index may be computed based on the hash, and the respective flag of the index is assigned the value of 1.

As shown in FIG. 3, the valid backup #1 is represented by the root hash #1, where the root hash #1 refers to the hash #2 and the hash #3 that refer to the data chunk #1 and the data chunk #2, respectively. In the example, the flag may be determined through the root hash #1 and assigned the value of 1. Likewise, the respective flags may be determined through the hash #2 and the hash #3 and assigned the value of 1.

Given that the flag is only assigned the value of 1, the flag may be a single-bit flag. In the case, a lot of storage space may be saved. Alternatively, the flag may also be assigned 0. For example, a flag for the invalid backups in the set 206 may be generated likewise. For another example, a flag may be generated for backups in the sets 204 and 206, where the flag of the valid backups is 1 while the flag of the invalid backups is 0. For convenience, description will be provided in combination of generation of a flag for backups in the set 204, and it would be appreciated that the following solution may be applied easily to other embodiments.

In addition to generating records for valid records in the set 204, the invalid backups in the set 206 may be processed. For example, the processing may be performed concurrently with the process of generating the flag in the set 204. For example, the hash tree is traversed from the top of the hash tree of the invalid backups, and for each node, it may be determined whether the node has a respective flag or not. If yes, it indicates that the node is still referred to by other valid backups, and the node (or the data chunk where the node is located) cannot be deleted. Moreover, if a node is referred to by other nodes, the nodes at its bottom are still being referred to. Hence, there is no need for further traversing down the nodes of the hash tree, thereby skipping a lot of unnecessary flag checks.

Figure 4:
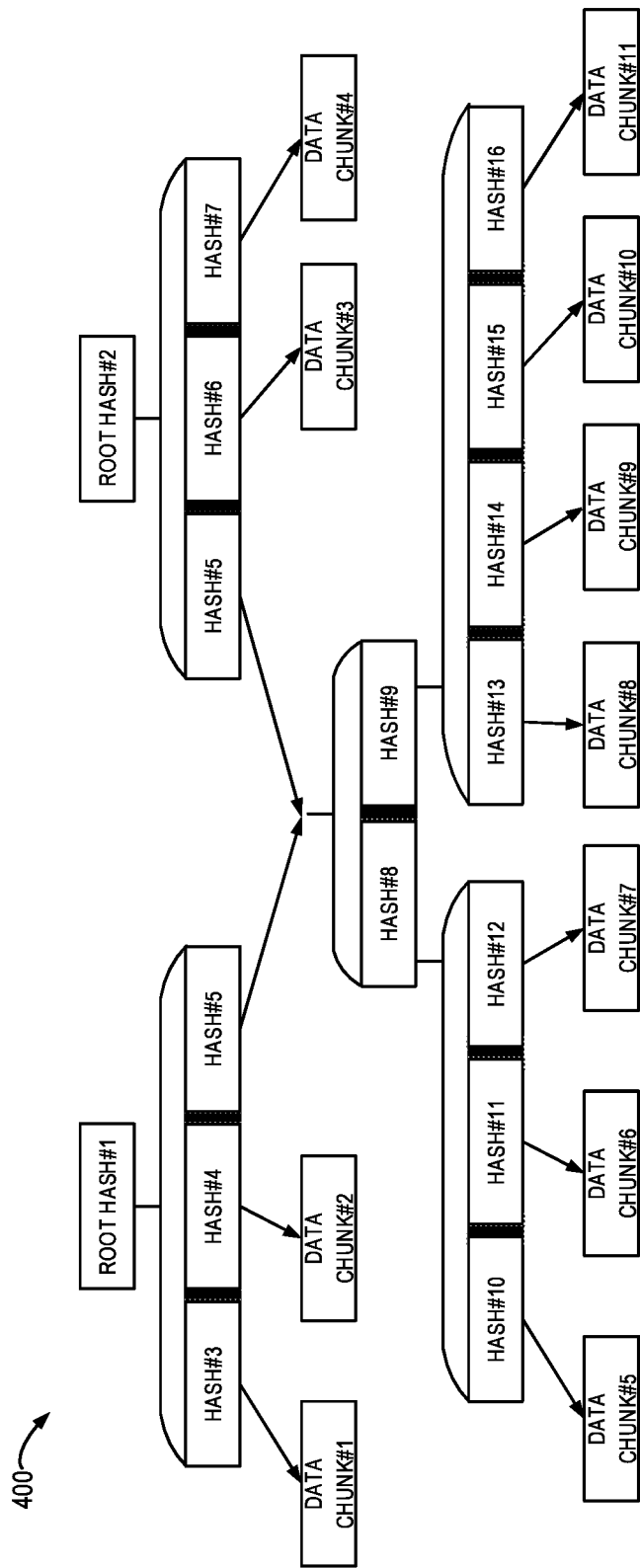
FIG. 4 illustrates an interaction diagram of a backup system according to some embodiments of the present disclosure.

FIG. 4 illustrates a schematic diagram of a hash tree 400 according to some embodiments of the present disclosure. As shown in FIG. 4, the backup represented by the root hash #2 is invalid due to expiration. However, the hash #5 is still referred to by the valid backup represented by the root hash #1, and the data chunks referred to by the hash #8, hash #9 and the hashes below hash #9 may be skipped. In this way, many unnecessary checks on reference mappings may be skipped.

If there is no a corresponding flag, the node may be deleted safely. For example, the data chunk represented by the root hash #2 may be deleted, the content in which is spliced from the hash #5, the hash #6 and the hash #7. The above operation may be repeated until all backups in the set 206 are processed, so as to complete the garbage collection operation.

According to the above embodiments, the garbage collection may be triggered by invalid backups. For example, the garbage collection may be started from a data chunk belonging to an invalid backup. This is a garbage collection solution on demand, excluding periodically checking and updating a reference number array.

As compared to the existing garbage processing solution, the space occupied by reference mappings is reduced dramatically, since the method includes therein creating records or flags only for data chunks referred to by the still valid backups, in which the reference number is reduced from at least 8 bits to 1 bit. Even under the worst circumstance that all data chunks are still valid, the space occupied the reference mappings is still ⅛ of the existing solution. In addition, due to the logical complexity of the garbage collection process, it is unnecessary to remove the zero-referred data chunks by traversing the reference mappings, and decrease the reference data of other data chunks referred to by the deleted data chunks round by round. Multiple threads can be used to check the reference of data chunks for several backups simultaneously, so the time complexity is $O(n)$.

Due to the low resource consumption of this solution, a system that adopts the solution for data collection can expand its maximum supported capacity size, without concern of hanging on garbage collection.

Figure 5:
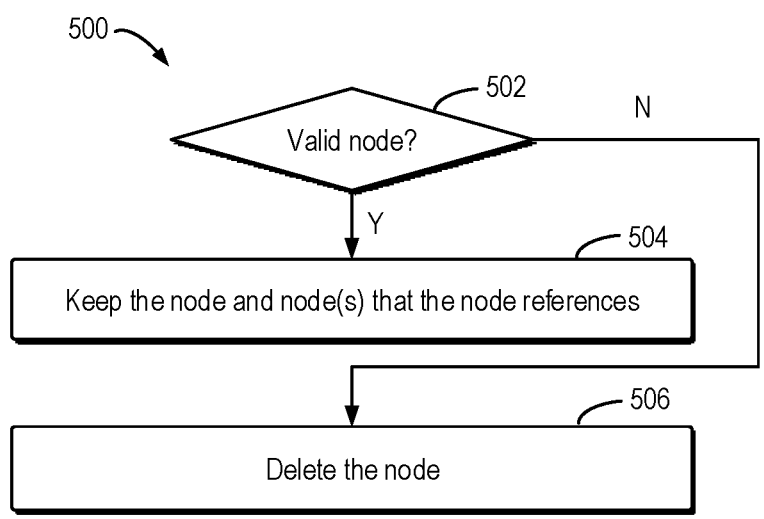
FIG. 5 illustrates a flowchart of a method for garbage collection according to some embodiments of the present disclosure.

FIG. 5 illustrates a flowchart of a garbage collection method 500 according to some embodiments of the present disclosure. One or more steps of the method 500 may be combined with one or more features of the examples as shown in FIGS. 1-4.

At 502, based on a flag associated with at least some nodes in a tree representation of a backup system, it is determined whether a node in the tree representation is associated with a valid backup or an invalid backup. For example, the tree representation may be a hash tree representing the backup system, and nodes in the tree representation may be nodes in the hash tree. It would be appreciated that, although the hash tree is used here as an example, any appropriate tree representation, other than the hash tree, may be applied to this example of the present disclosure. For example, the flag may be a single-bit flag to save memory space.

In some embodiments, valid backups in the backup system may be determined based on metadata of the backup system, and a flag indicating that nodes associated with the valid backups are valid may be generated. In the circumstance, if a flag corresponding to a node can be found, the node belongs to a valid backup. If a flag corresponding to a node cannot be found, the node belongs to an invalid backup.

Alternatively, invalid backups in the backup system may be determined based on the metadata of the backup system, and a flag indicating that nodes associated with the invalid backups are valid may be generated. In the circumstance, if a flag corresponding to a node can be found, the node belongs to an invalid backup. If a flag corresponding to a node cannot be found, the node belongs to a valid backup.

Alternatively, flags having different values may be generated for valid backups and invalid backups. For example, the valid backup is 1 while the invalid backup is 0. In the circumstance, if the flag corresponding to a node has a value of 1, the node belongs to a valid backup, if the flag corresponding to a node has a value of 0, the node belongs to an invalid backup.

If it is determined at 502 that the node belongs to a valid backup, the method 500 moves to 504 where the node and nodes referring to the node are reserved. In this way, it is unnecessary to further determine any node under the node, thereby improving the efficiency.

If it is determined at 502 that the node is an invalid backup, the method 500 moves to 502 where the node is deleted. If the node is not a leaf node, child nodes of the node may be further traversed, and the node is deleted after traversing all the child nodes. If the node is a leaf node, the data chunk represented by the node is deleted directly.

Figure 6:
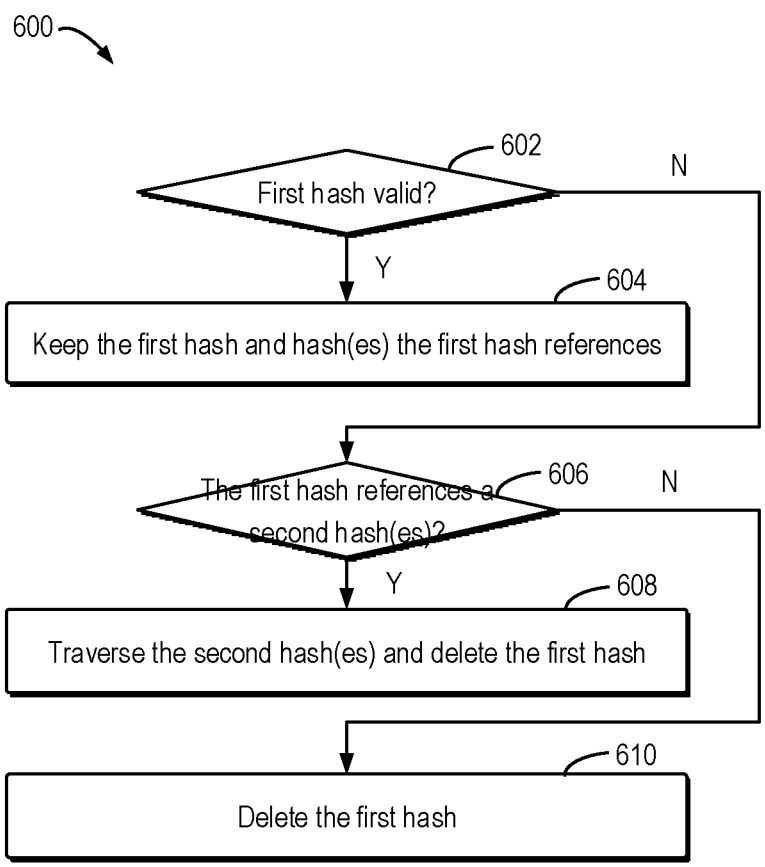
FIG. 6 illustrates a flowchart of a method for garbage collection according to some embodiments of the present disclosure.

FIG. 6 illustrates a flowchart of a garbage collection method 600 according to some embodiments of the present disclosure. One or more steps in the method 600 may be combined with one or more features in the examples as shown in FIGS. 1-4, and may be combined with one or more steps in the method 500.

At 602, based on the metadata of the backup system, it is determined whether a first hash in a hash tree representing the backup system is associated with a valid backup or an invalid backup.

In some embodiments, valid backups and invalid backups in the backup system may be identified based on the metadata of the backup system, and a flag indicating that a hash in the hash tree is associated with a valid backup, and/or a flag indicating that a hash in the hash tree is associated with an invalid backup is generated. The flag may be a single-bit flag to save the memory space.

If it is determined at 602 that the first hash is valid, the method 600 moves to 604 where the first hash and hashes referred to by the first hash are reserved. In this way, there is no need for further traversing down the hash tree, thereby improving computing efficiency.

If it is determined at 602 that the first hash is invalid, the method moves to 606 where it is determined whether the first hash refers to a second hash.

If it is determined at 606 that the first hash refers to the second hash, the method 600 moves to 608 where the second hash is traversed and the first hash is deleted after traversing the second hash.

If it is determined at 606 that the first hash does not refer to the second hash, the method 600 moves to 610 where the first hash is deleted.

In the method 600, the backup system can perform efficient garbage collection, since it is unnecessary to determine whether each node belongs to a valid backup.

Figure 7:
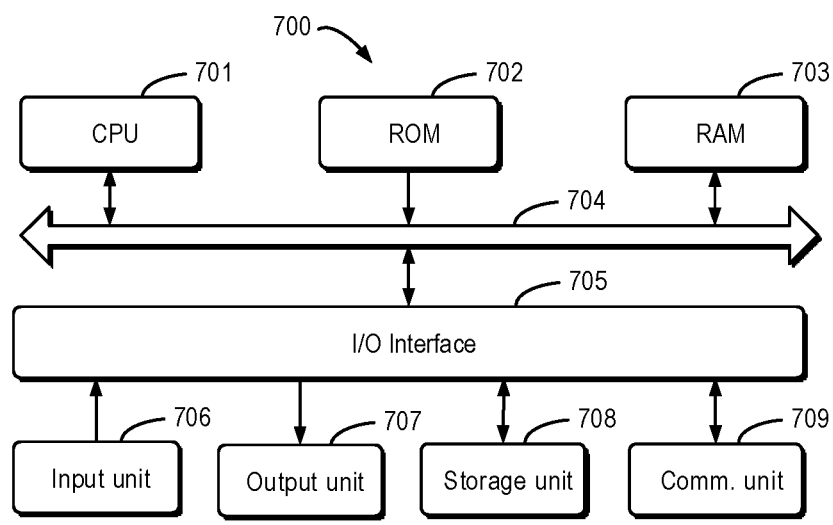
FIG. 7 illustrates a schematic block diagram of an example device that can be used to implement embodiments of the present disclosure according to some embodiments of the present disclosure.

FIG. 7 illustrates a device 700 that can implement embodiments of the present disclosure. As shown, the device 700 includes a central processing unit (CPU) 701 that can perform various appropriate acts and processing based on computer program instructions stored in a read-only memory (ROM) 702 or computer program instructions loaded from a storage unit 708 to a random access memory (RAM) 703. In the RAM 703, there further store various programs and data needed for operations of the device 700. The CPU 701, ROM 702 and RAM 703 are connected to each other via a bus 704. An input/output (I/O) interface 705 is also connected to the bus 704.

The following components in the device 700 are connected to the I/O interface 705: an input unit 706, such as a keyboard, a mouse and the like; an output unit 707, such as various kinds of displays and a loudspeaker, etc.; a storage unit 708, such as a magnetic disk, an optical disk, and etc.; a communication unit 709, such as a network card, a modem, and a wireless communication transceiver, etc. The communication unit 709 allows the device 700 to exchange information/data with other devices through a computer network such as the Internet and/or various kinds of telecommunications networks.

Various processes and processing described above, e.g., the methods 500-600, can be executed by the processing unit 701. For example, in some embodiments, the methods 500-600 can be implemented as a computer software program that is tangibly embodied on a machine readable medium, e.g., the storage unit 708. In some embodiments, part or all of the computer programs can be loaded and/or mounted onto the device 700 via ROM 702 and/or communication unit 708. When the computer program is loaded to the RAM 703 and executed by the CPU 701, one or more steps of the methods 500-600 as described above can be executed.

The present disclosure can be a method, a device, a system and/or a computer program product. The computer program product can include a computer readable storage medium on which computer readable program instructions are carried out for performing each aspect of the present application.

The computer readable medium may be a tangible medium that may contain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer readable storage medium would include a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It would be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for garbage collection in a backup system, comprising:

traversing metadata associated with a plurality of backups stored in the backup system, and dividing the metadata into a first set associated with valid backups and a second set associated with invalid backups, wherein each of the plurality of backups is represented in the metadata, respectively, by a tree representation of data of the plurality of backups stored in the backup system, each tree representation comprising a plurality of nodes, each of the plurality of nodes comprising a corresponding one of a plurality of hashes including a root hash that references at least a second of the plurality of hashes that references an element of a storage device containing a portion of the data of the plurality of backups, wherein at least one of the plurality of hashes associated with a first backup references a same portion of the data as a different one of the plurality of hashes from a different one of the plurality of backups, and wherein the data stored in the backup system for each of the plurality of backups is represented by a different subset of the plurality of nodes of the tree representation, wherein the metadata is divided by assigning, to each root hash of each tree representation associated with the valid backup, a respective single bit flag having a first value, and assigning, to each root hash of each tree representation associated with the invalid backup, a respective single bit flag having a second value;

for each of the plurality of nodes of each valid backup and not for each invalid backup, generating a flag indicating that the node is associated with the valid backup;

determining, based on the respective single bit flag associated with a root hash of the plurality of nodes in the tree representation of the backup system, whether the root hash in the tree representation is associated with the valid backup or an invalid backup;

in response to respective single bit flag indicating that the root hash is associated with the valid backup, skipping processing of the respective tree representation of the backup system associated with the valid backup and keeping the respective tree representation; and in response to the single bit flag indicating that the root hash is associated with the invalid backup, deleting the root hash of the respective tree representation associated with the invalid backup and traversing additional one or more nodes of the respective tree presentation associated with the invalid backup; and for each of the additional one or more nodes of the respective tree representation of the respective invalid backup,
  determining, whether a corresponding single bit flag is found, and
  in response to the corresponding single bit flag not being found, deleting the respective one of the additional one or more nodes.

2. The method of claim 1, wherein the backup system stores the plurality of backups with deduplication.

3. The method of claim 1, wherein each tree representation of the backup system comprises a Merkle tree representing each backup, and the nodes in the tree representation comprise nodes in the Merkle tree.

4. The method of claim 1, wherein the second of the root hashes comprises a hash of a data chunk storing the portion of the data of the plurality of backups.

5. The method of claim 1, wherein a backup becomes invalid based on expiration of the backup.

6. A device for garbage collection in a backup system, comprising:
  a processing unit; and
  a memory coupled to the processing unit and having instructions stored thereon, the instructions when executed by the processing unit causing the device to execute acts comprising:
  traversing metadata associated with a plurality of backups stored in the backup system, and dividing the metadata into a first set associated with valid backups and a second set associated with invalid backups, wherein each of the plurality of backups is represented in the metadata, respectively, by a tree representation of data of the plurality of backups stored in the backup system, each tree representation comprising a plurality of nodes, each of the plurality of nodes comprising a corresponding one of a plurality of hashes including a root hash that references at least a second of the plurality of hashes that references an element of a storage device containing a portion of the data of the plurality of backups, wherein at least one of the plurality of hashes associated with a first backup references a same portion of the data as a different one of the plurality of hashes from a different one of the plurality of backups, and wherein the data stored in the backup system for each of the plurality of backups is represented by a different subset of the plurality of nodes of the tree representation, wherein the metadata is divided by assigning, to each root hash of each tree representation associated with the valid backup, a respective single bit flag having a first value, and assigning, to each root hash of each tree representation associated with the invalid backup, a respective single bit flag having a second value;

for each of the plurality of nodes of each valid backup and not for each invalid backup, generating a flag indicating that the node is associated with the valid backup;

determining, based on the respective single bit flag associated with root hash of the plurality of nodes in the tree representation of the backup system, whether the root hash in the tree representation is associated with the valid backup or an invalid backup;

in response to respective single bit flag indicating that the root hash is associated with the valid backup, skipping processing of the respective tree representation of the backup system associated with the valid backup and keeping the respective tree representation; and in response to the single bit flag indicating that the root hash is associated with the invalid backup, deleting the root hash of the respective tree representation associated with the invalid backup and traversing additional one or more nodes of the respective tree presentation associated with the invalid backup; and for each of the additional one or more nodes of the respective tree representation of the respective invalid backup,
  determining, whether a corresponding single bit flag is found, and
  in response to the corresponding single bit flag not being found, deleting the respective one of the additional one or more nodes.

7. The device of claim 6, wherein the backup system stores the plurality of backups with deduplication.

8. The device of claim 6, wherein the tree representation of the backup system comprises a Merkle tree representing the backup system, and the nodes in the tree representation comprise nodes in the Merkle tree.

9. A computer readable storage medium storing machine-executable instructions which cause, when executed by at least one processor, causing the at least one processor to perform operations, the operations comprising:
  traversing metadata associated with a plurality of backups stored in the backup system, and dividing the metadata into a first set associated with valid backups and a second set associated with invalid backups, wherein each of the plurality of backups is represented in the metadata, respectively, by a tree representation of data of the plurality of backups stored in the backup system, each tree representation comprising a plurality of nodes, each of the plurality of nodes comprising a corresponding one of a plurality of hashes including a root hash that references at least a second of the plurality of hashes that references an element of a storage device containing a portion of the data of the plurality of backups, wherein at least one of the plurality of hashes associated with a first backup references a same portion of the data as a different one of the plurality of hashes from a different one of the plurality of backups, and wherein the data stored in the backup system for each of the plurality of backups is represented by a different subset of the plurality of nodes of the tree representation, wherein the metadata is divided by assigning, to each root hash of each tree representation associated with the valid backup, a respective single bit flag having a first value, and assigning, to each root hash of each tree representation associated with the invalid backup, a respective single bit flag having a second value;

for each of the plurality of nodes of each valid backup and not for each invalid backup, generating a flag indicating that the node is associated with the valid backup;

determining, based on the respective single bit flag associated with root hash of the plurality of nodes in the tree representation of the backup system, whether the root hash in the tree representation is associated with the valid backup or an invalid backup;

in response to respective single bit flag indicating that the root hash is associated with the valid backup, skipping processing of the respective tree representation of the backup system associated with the valid backup and keeping the respective tree representation; and in response to the single bit flag indicating that the root hash is associated with the invalid backup, deleting the root hash of the respective tree representation associated with the invalid backup and traversing additional one or more nodes of the respective tree presentation associated with the invalid backup; and for each of the additional one or more nodes of the respective tree representation of the respective invalid backup, determining, whether a corresponding single bit flag is found, and in response to the corresponding single bit flag not being found, deleting the respective one of the additional one or more nodes.

10. The computer readable storage medium of claim 9, wherein the backup system stores the plurality of backups with deduplication.

\* \* \* \* \*